US010254675B2

(12) United States Patent
Yuasa et al.

(10) Patent No.: US 10,254,675 B2
(45) Date of Patent: Apr. 9, 2019

(54) OPTICAL WRITING APPARATUS AND IMAGE FORMING APPARATUS

(71) Applicant: Konica Minolta, Inc., Tokyo (JP)

(72) Inventors: Takafumi Yuasa, Toyokawa (JP); Akira Taniyama, Hino (JP); Hidenari Tachibe, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/926,304

(22) Filed: Mar. 20, 2018

(65) Prior Publication Data

US 2018/0275550 A1 Sep. 27, 2018

(30) Foreign Application Priority Data

Mar. 22, 2017 (JP) ................. 2017-056614

(51) Int. Cl.
G03G 15/00 (2006.01)
G03G 15/01 (2006.01)
G03G 15/04 (2006.01)
G02B 27/09 (2006.01)
H04N 1/028 (2006.01)
G03G 21/20 (2006.01)

(52) U.S. Cl.
CPC ..... *G03G 15/0189* (2013.01); *G02B 27/0961* (2013.01); *G03G 15/04054* (2013.01); *G03G 21/206* (2013.01); *H04N 1/02815* (2013.01)

(58) Field of Classification Search
CPC ............ G02B 27/0905; G02B 27/0961; G03G 15/04054; G03G 21/206; H04N 1/02815
See application file for complete search history.

(56) References Cited

U.S. PATENT DOCUMENTS

| 2006/0120748 A1* | 6/2006 | Takehara | G03G 21/206 399/92 |
| 2008/0025750 A1* | 1/2008 | Yamazaki | G02B 26/121 399/92 |
| 2013/0088558 A1* | 4/2013 | Nakajima | B41J 2/451 347/224 |
| 2013/0108309 A1* | 5/2013 | Yamanaka | G03G 21/206 399/92 |

FOREIGN PATENT DOCUMENTS

JP 2010113893 A 5/2010

* cited by examiner

Primary Examiner — Walter L Lindsay, Jr.
Assistant Examiner — Jessica L Eley
(74) Attorney, Agent, or Firm — Lucas & Mercanti, LLP

(57) ABSTRACT

An optical writing apparatus includes: a light source panel including light emitting elements arranged on an elongate glass substrate; an optical member that causes emergent light to form an image; a first holding member holding the optical member; and a second holding member holding the glass substrate, wherein legs are provided below the first holding member on sides of both ends, the legs extending downward, drooping ends of the legs being mounted and fixed on the second holding member, one end of the glass substrate is positioned inside the space, an integrated circuit being provided, a through hole is provided to an upper surface of the second holding member, and when cooling air for the integrated circuit flows into the space, the cooling air is guided through the through hole to a side of a lower surface of the upper surface of the second holding member.

12 Claims, 9 Drawing Sheets

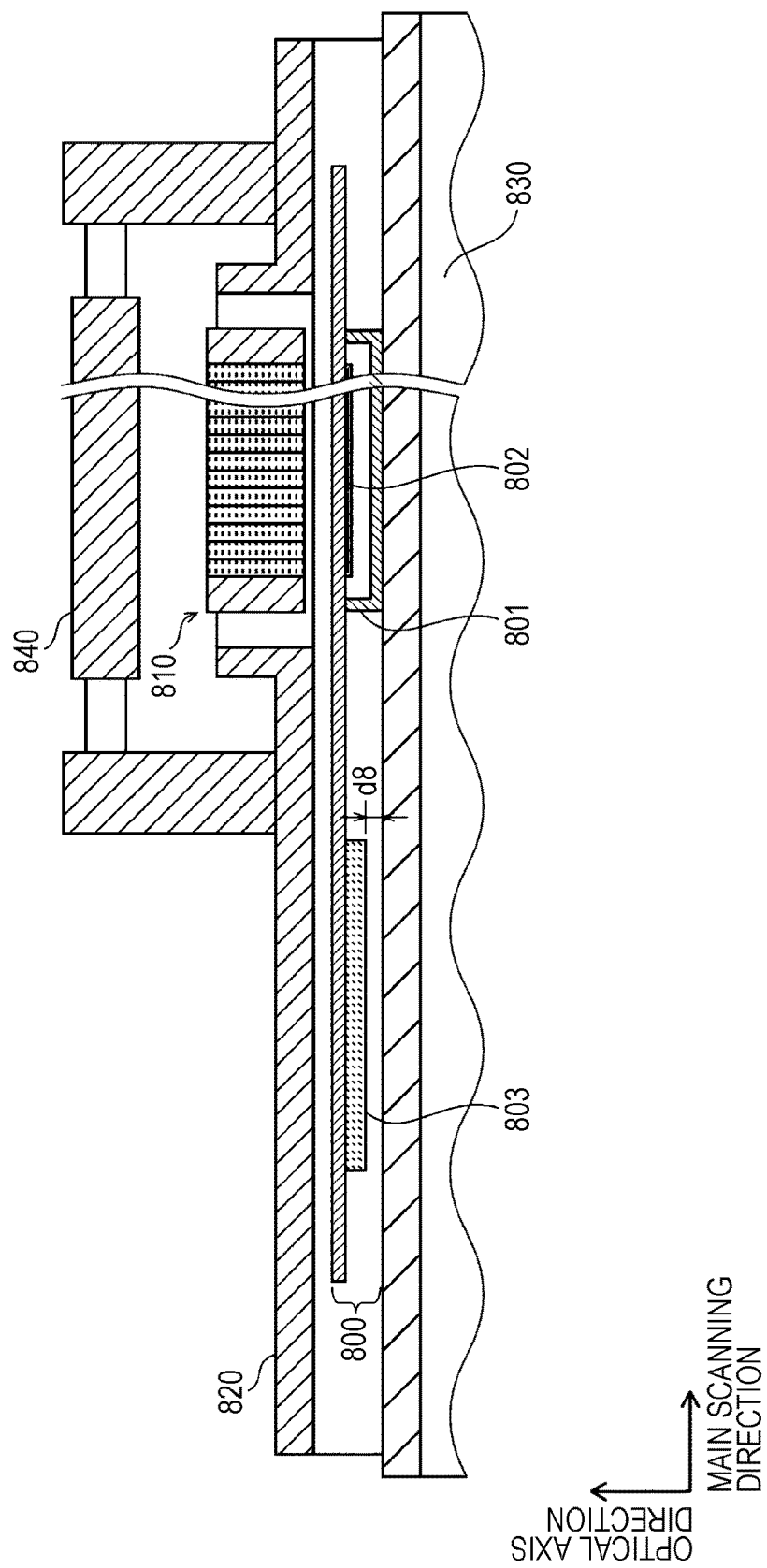

OPTICAL WRITING APPARATUS AND IMAGE FORMING APPARATUS

The entire disclosure of Japanese patent Application No. 2017-056614, filed on Mar. 22, 2017, is incorporated herein by reference in its entirety.

BACKGROUND

Technological Field

The present invention relates to an optical writing apparatus and an image forming apparatus, and particularly relates to a technology of effectively cooling an integrated circuit included in the optical writing apparatus.

Description of the Related Art

An electrophotographic image forming apparatus includes an optical writing apparatus in order to form an electrostatic latent image onto the outer circumferential surface of a photoconductor drum. Examples of the optical wring apparatus include a deflection-scanning-type optical writing apparatus and a line-type optical writing apparatus. For the line-type optical writing apparatus, an organic light emitting diode print head (OLED-PH) using an OLED as a light source, has attracted attention.

For the OLED-PH, a drive integrated circuit (IC) is used in order to control the OLED to turn on or off or the amount of emission. When the drive IC generates heat due to energization in optical writing, the OLED-PH deforms due to thermal expansion. As a result, the light-condensing efficiency of condensing emergent light from the OLED onto the outer circumferential surface of the photoconductor drum, decreases and then image quality degrades. In order to solve the problem, it is considered that cooling air is supplied to the drive IC to facilitate heat dissipation.

A typical OLED-PH includes, as illustrated in FIG. 8, an OLED panel 800 including a plurality of OLEDs 802 linearly arranged on a glass substrate, a lens array 810 that condenses emergent light from the OLEDs 802 onto the outer circumferential surface of a photoconductor drum 840, a lens holder 820 holding the lens array 810, and a base holder 830 holding the OLED panel 800 and the lens holder 820.

The OLED panel 800 protects the OLEDs 802 by sealing with a sealing glass 801. The sealing glass 801 abuts on the base holder 830, so that the OLED panel 800 is held.

A drive IC 803 is mounted on the OLED panel 800 in order to control the amount of emission of the OLEDs 802. The drive IC 803 generates heat in operation. There is a risk that a defect, such as a malfunction, occurs when the drive IC 803 rises in temperature, and thus cooling air is typically supplied to the drive IC 803.

However, the interval d8 between the drive IC 803 and the base holder 830, is substantially the same as the difference in height between the drive IC 803 and the sealing glass 801, and is as narrow as a little less than 1.0 mm. Thus, a sufficient amount of cooling air is not allowed to flow between the drive IC 803 and the base holder 830 unless a large air pressure difference is generated.

In order to solve the problem, for example, as illustrated in FIG. 9, it has been proposed that a cooling air duct 904 is provided in a draft channel 903 to guide cooling air along arrow B, in order to cool an induction heating coil 902 provided in a casing 901 of an induction heating cooker 9 (e.g., refer to JP 2010-113893 A). Application of the technology of narrowing the draft channel 903 with the cooling air duct 904, allows the cooling air to increase in speed, so that cooling efficiency can improve.

SUMMARY

However, providing a cooling air duct between the drive IC 803 and the base holder 830, further narrows the originally narrow interval. Noise occurs when the air flows through the narrow space, and thus the application is not suitable to an image forming apparatus assumed to be used in an office. In addition, there is a problem that component costs rise due to the provision of the cooling air duct.

The present invention has been made in consideration of the problems, and an object of the present invention is to provide an optical writing apparatus and an image forming apparatus, capable of cooling a drive IC without occurrence of noise and an increase in cost.

To achieve the abovementioned object, according to an aspect of the present invention, an optical writing apparatus reflecting one aspect of the present invention comprises: a light source panel including a plurality of light emitting elements linearly arranged on an elongate glass substrate; an optical member that causes emergent light from the plurality of light emitting elements to form an image onto an object to be irradiated; a first holding member holding the optical member; and a second holding member holding the glass substrate floating above, wherein legs are provided below the first holding member on sides of both ends in a lateral direction of the glass substrate, the legs extending downward, drooping ends of the legs being mounted and fixed on the second holding member, the first holding member and the second holding member surrounding the glass substrate such that a space is present above and below the glass substrate, one end of the glass substrate is positioned inside the space surrounded by the first holding member and the second holding member, an integrated circuit that drives the light emitting elements to turn on, being provided on a lower surface on a side of the one end of the glass substrate, a through hole is provided to an upper surface facing the glass substrate, of the second holding member on a center side from the integrated circuit in a longitudinal direction, and when cooling air for the integrated circuit flows from the side of the one end into the space surrounded by the first holding member and the second holding member, the cooling air is guided through the through hole to a side of a lower surface of the upper surface facing the glass substrate, of the second holding member.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a sectional view of the main configuration of an optical writing apparatus according to the related art.

DETAILED DESCRIPTION OF EMBODIMENTS

Hereinafter, one or more embodiments of an optical writing apparatus and an image forming apparatus according to the present invention will be described with reference to the drawings. However, the scope of the invention is not limited to the disclosed embodiments.

[1] Configuration of Image Forming Apparatus

First, the configuration of the image forming apparatus according to the present embodiment, will be described.

Figure 1:
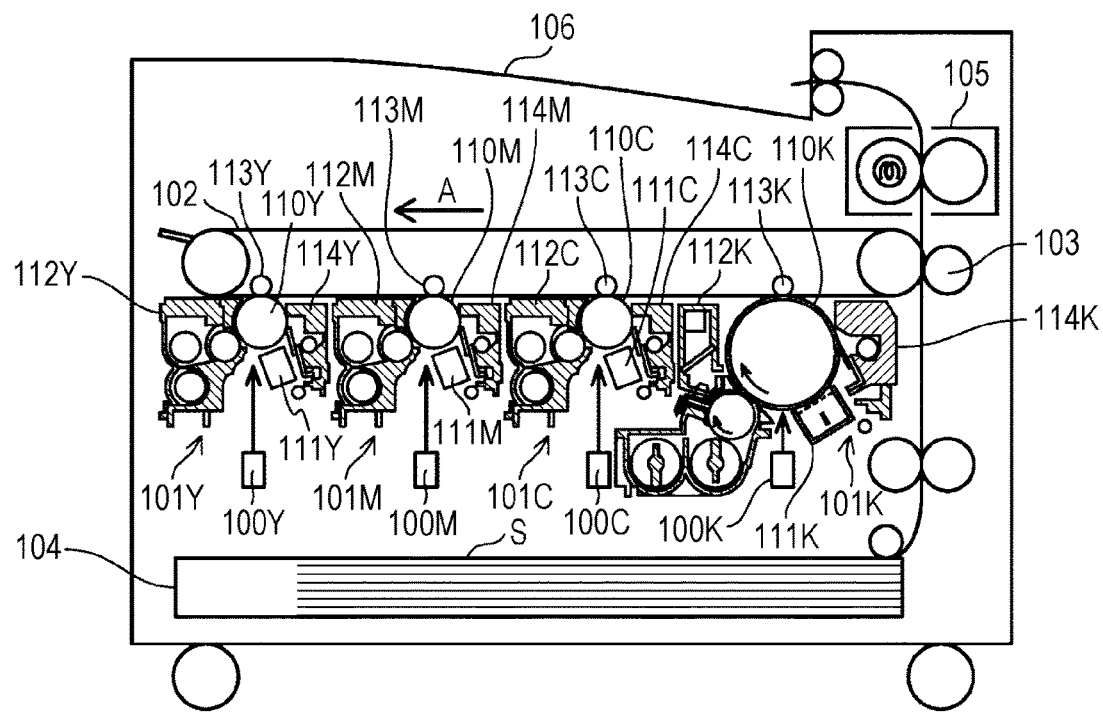
FIG. 1 is a sectional view of the main configuration of an image forming apparatus according to an embodiment of the present invention.

As illustrated in FIG. 1, the image forming apparatus 1 is a so-called tandem color printer. The image forming apparatus 1 includes image formers 101Y, 101M, 101C, and 101K, and forms respective toner images in yellow (Y), magenta (M), cyan (C), and black (K). The image formers 101Y, 101M, 101C, and 101K include optical writing apparatuses 100Y, 100M, 100C, and 100K, photoconductor drums 110Y, 110M, 110C, and 110K, electrifying apparatuses 111Y, 111M, 111C, and 111K, developing apparatuses 112Y, 112M, 112C, and 112K, and cleaning apparatuses 114Y, 114M, 114C, and 114K, respectively.

In forming a color image, the image formers 101Y, 101M, 101C, and 101K first cause the electrifying apparatuses 111Y, 111M, 111C, and 111K to uniformly electrify the outer circumferential surfaces of the photoconductor drums 110Y, 110M, 110C, and 110K, respectively. The optical writing apparatuses 100Y, 100M, 100C, and 100K form electrostatic latent images onto the outer circumferential surfaces of the photoconductor drums 110Y, 110M, 110C, and 110K, and the developing apparatuses 112Y, 112M, 112C, and 112K supply toner to render the electrostatic latent images visible, respectively.

Primary transfer rollers 113Y, 113M, 113C, and 113K sequentially electrostatically transfer the toner images in Y, M, C, and K supported on the outer circumferential surfaces of the photoconductor drums 110Y, 110M, 110C, and 110K onto an intermediate transfer belt 102, respectively, such that the toner images in Y, M, C, and K are superimposed on each other (primary transfer). The color toner image is formed with this arrangement. After the primary transfer, the cleaning apparatuses 114Y, 114M, 114C, and 114K remove the remaining toner on the outer circumferential surfaces of the photoconductor drums 110Y, 110M, 110C, and 110K, respectively.

The intermediate transfer belt 102 includes an endless belt, and conveys the color toner image to paired secondary transfer rollers 103, rotationally traveling along arrow A. In parallel to this, recording sheets S housed in a paper tray 104 are one by one fed and conveyed to the paired secondary transfer rollers 103, and then the color toner image is electrostatically transferred to a recording sheet S at a secondary transfer nip (secondary transfer). After that, a fusing apparatus 105 thermally fuses the color toner image onto the recording sheet S, and then the recording sheet S is ejected onto a paper output tray 106.

The following descriptions are uniform regardless of the toner colors, and thus will be given with characters of YMCK omitted.

[2] Configuration of Optical Writing Apparatus 100

Next, the configuration of the optical writing apparatus 100 will be described.

Figure 2:
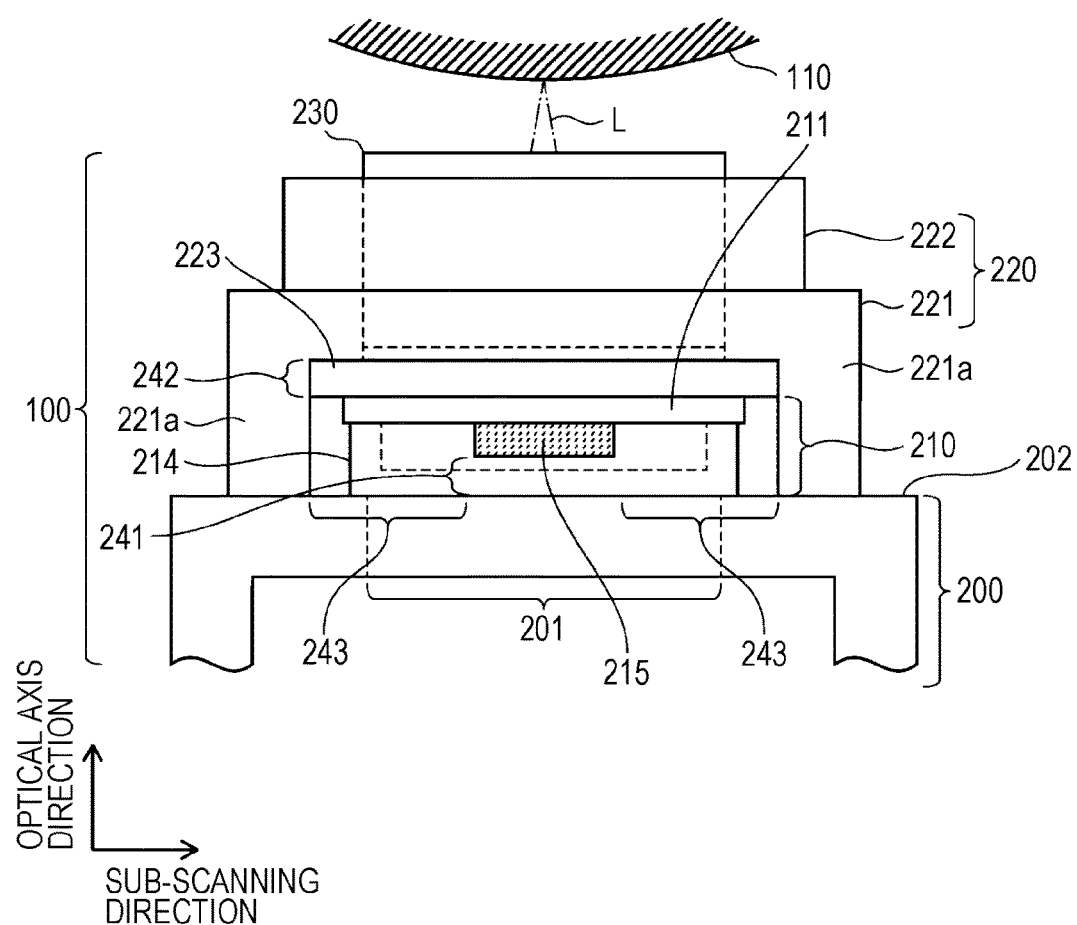
FIG. 2 is an external view of the main configuration of an optical writing apparatus.
Figure 3:
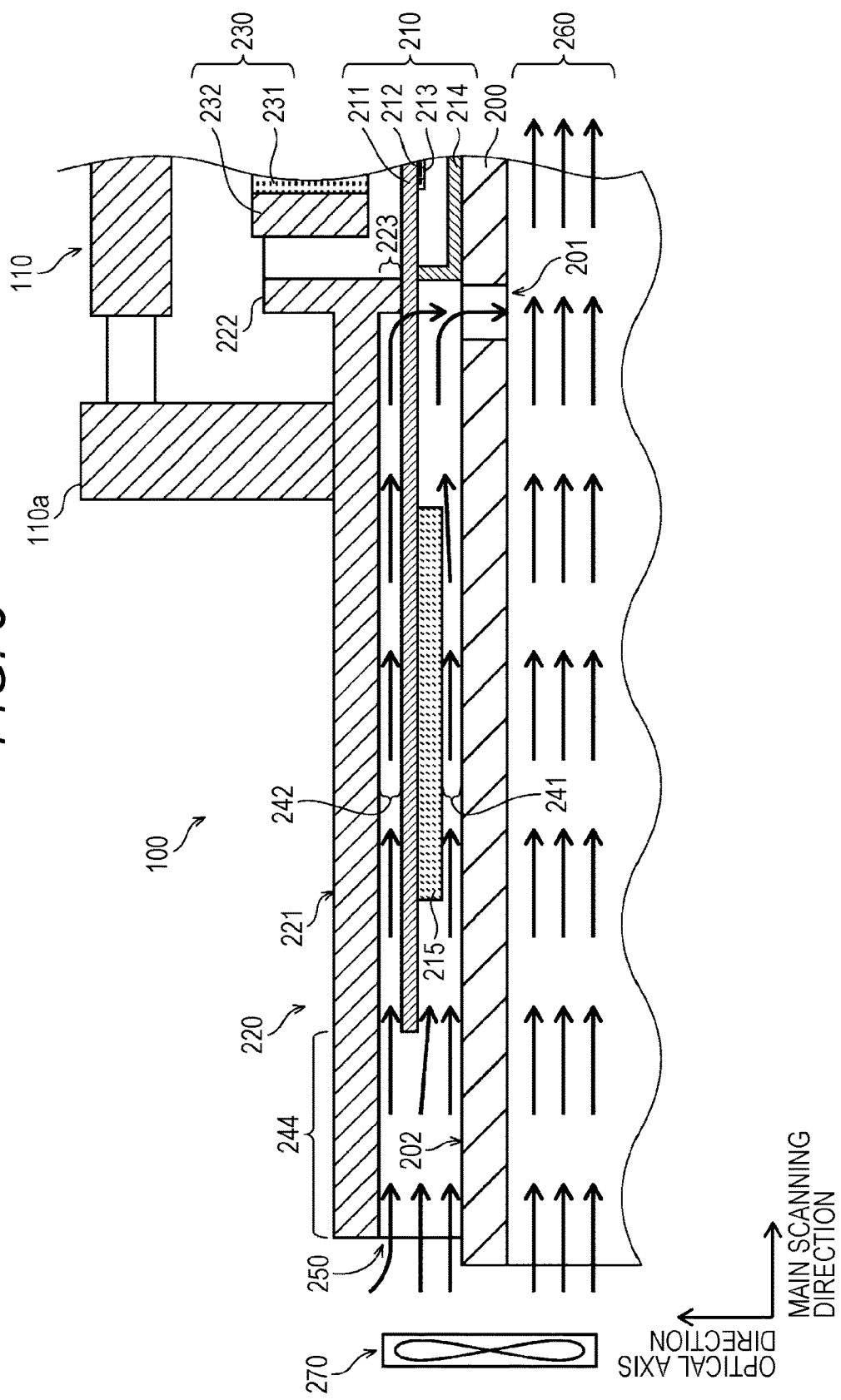
FIG. 3 is a sectional view of the main configuration of the optical writing apparatus.

As illustrated in FIGS. 2 and 3, the optical writing apparatus 100 includes an OLED panel 210 being a light source panel, a lens holder 220 being a first holding member, a lens array 230 being an optical member, and a base holder 200 being a second holding member. The OLED panel 210 includes a glass substrate 211 elongating in a main scanning direction. The glass substrate 211 is disposed such that the longitudinal direction thereof is identical to the main scanning direction and the lateral direction thereof is identical to a sub-scanning direction.

Note that, in the present specification, regardless of whether the optical axis direction of the lens array 230 is identical to the vertical direction, the side of the photoconductor drum 110 is referred to as the upper side or the above and the opposite side thereto is referred to as the lower side or the below, in the optical axis direction. Similarly, a surface facing upward is referred to as an upper surface and a surface facing downward is referred to as a lower surface.

A thin film transistor (TFT) circuit 213 including a plurality of OLEDs 212 linearly arranged (e.g., 15,000 OLEDs), is formed on the glass substrate 211. Note that, the OLEDs 212 may be arranged in a line or may be staggered-arranged in a plurality of lines. Emergent light from the OLEDs 212 implemented on the main surface (lower surface) of the glass substrate 211, passes through the glass substrate 211. Then, the emergent light is emergent from the side of the back surface (upper surface), to be incident on the lens array 230. The implemented region of the OLEDs 212 on the TFT circuit 213 is referred to as an "emission region" below.

A drive integrated circuit (IC) 215 is implemented on the side of one end in the main scanning direction on the glass substrate 211. The drive IC 215 is connected to the TFT circuit 213, and turns the OLEDs 212 on or off in accordance with image data in optical writing. The emergent light L from the OLEDs 212 passes through the glass substrate 211, and then the lens array 230 condenses the emergent light L onto the outer circumferential surface of the photoconductor drum 110.

A sealing member 214 seals a region including the TFT circuit 213, in order to protect the OLEDs 212 from the external air. Nitrogen or a desiccating agent may be sealed into the sealed space.

The base holder 200 is a substantially U-shaped sheet-metal member made of steel, such as stainless steel (SUS). The sealing member 214 is fixed on the upper surface 202 of the base holder 200 (hereinafter, referred to as a "supporting surface"), and this arrangement causes the OLED panel 210 to be positioned. Since the supporting surface 202 is apart from the drive IC 215, cooling air blown by a fan 270 can flow through a space 241 between the supporting surface 202 and the drive IC 215.

Figure 4:
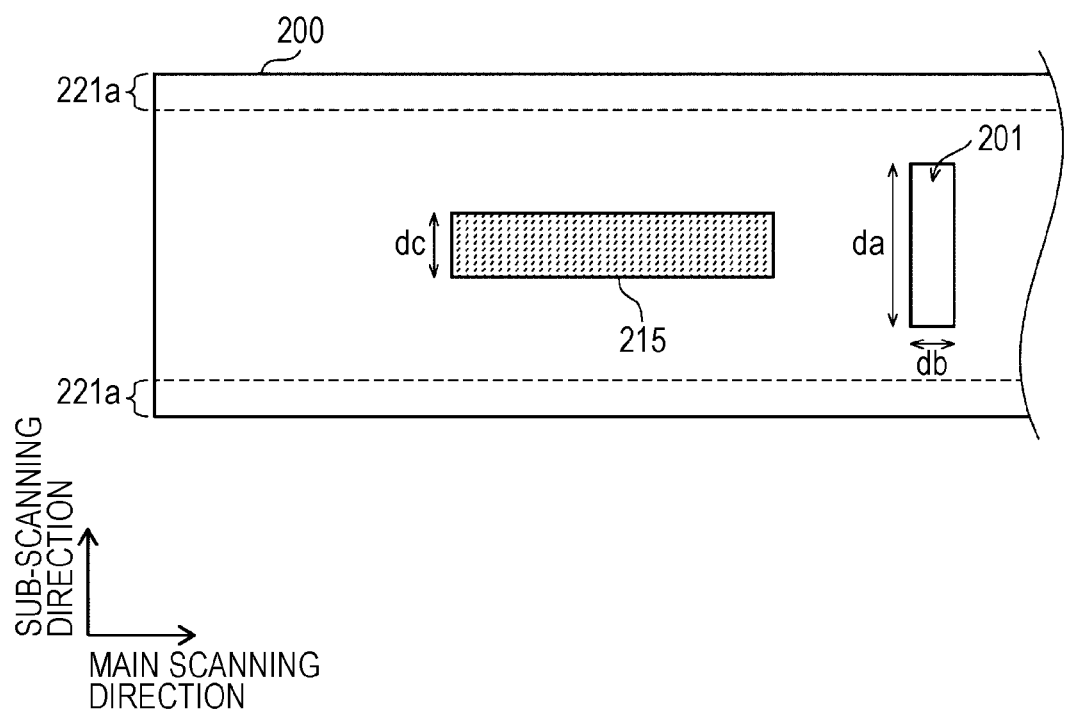
FIG. 4 is a plan view of the shapes of a drive IC and a through hole.

A through hole 201 having a width of da in the sub-scanning direction and a width of db in the main scanning direction, is provided between the sealing member 214 and the drive IC 215 in the main scanning direction of the base holder 200, so that the cooling air can flow (refer to FIG. 4). The center position of the through hole 201 in the sub-scanning direction, is identical to the center position of the drive IC 215 in the sub-scanning direction.

The through hole 201 has the width of da in the sub-scanning direction larger than the width of db in the main scanning direction, as illustrated in FIG. 4.

$$da > db \tag{1}$$

This arrangement inhibits the cooling air heated by heat generated by the drive IC 215, from gathering in the center portion in the sub-scanning direction, so that a shift can be inhibited in the position of the emission region implemented on the center portion of the OLED panel 210 in the sub-scanning direction. The OLEDs 212 have a temperature characteristic in which the amount of emission varies due to a variation in temperature. Thus, when the cooling air rising in temperature gathers in the center portion and the OLEDs 212 rise in temperature, the amount of emission varies. Against this, the inhibition of the gathering of the cooling air can inhibit image degradation arising from the variation in the amount of emission of the OLEDs 212.

The width of da of the through hole 201 in the sub-scanning direction is larger than the width of dc of the drive IC 215 in the sub-scanning direction.

$$da > dc \tag{2}$$

In this manner, when a channel for the cooling air is larger than the width of dc of the drive IC 215 in the sub-scanning direction, the cooling air can blow the entire surface (lower surface) facing the base holder 200, of the drive IC 215.

The lens array 230 includes a plurality of rod lenses 231 staggered-arranged in two lines or more in the main scanning direction, fastened with resin 232. The lens array 230 condenses the emergent light L from the OLEDs 212 onto the outer circumferential surface of the photoconductor drum 110. For example, a Selfoc lens array (SLA, Selfoc is a registered trademark of Nippon Sheet Glass Co., Ltd.) can be used as the lens array 230.

The lens holder 220 is a member including a stand 221 and a holder 222 integrally formed with a resin material, the stand 221 surrounding the OLED panel 210, the stand 221 being fixed to the base holder 200, the holder 222 holding the lens array 230. Legs 221*a* are erectly provided at both ends of the stand 221 in the sub-scanning direction. Drooping ends extending downward in the optical axis direction of the legs 221*a*, are fixed to the base holder 200 such that the lens holder 220 is fixed to the base holder 200.

Furthermore, a standing wall 223 is erectly provided on the surface (lower surface) facing the glass substrate 211, of the stand 221. A drooping end of the standing wall 223 has a flat surface, and abuts on the glass substrate 211.

The standing wall 223 is provided over the entire width in the sub-scanning direction of the internal space of the stand 221. When the cooling air flows toward the standing wall 223 in the main scanning direction with this arrangement, air pressure increases in the vicinity of the standing wall 223 and an air pressure difference occurs in the optical axis direction, so that a channel guiding the cooling air toward the through hole 201 can be formed.

A photoconductor positioning member 110*a* abuts onto the upper surface of the stand 221, so that the relative position is regulated between the optical writing apparatus 100 and the photoconductor drum 110. Thus, pressure is applied in the optical axis direction onto the upper surface of the stand 221. Against this, the standing wall 223 is provided differently from the abutted position between the stand 221 and the photoconductor positioning member 110*a*, in the main scanning direction, so that a dip can be prevented at the contact between the photoconductor positioning member 110*a* and the stand 221. Therefore, the relative position can be highly precisely regulated between the optical writing apparatus 100 and the photoconductor drum 110.

The cooling air flowing from an opening 250 at an end on the side of the drive IC 215 in the main scanning direction, first passes in the main scanning direction through a space 244 from the opening 250 to an end of the glass substrate 211 in a space surrounded by the base holder 200 and the stand 221. After that, the cooling air branches and flows into a space 241 between the drive IC 215 and the supporting surface 202 of the base holder 200, a space 242 between the glass substrate 211 and the stand 221 of the lens holder 220, and two spaces 243 between both ends of the drive IC 215 and the legs 221*a* of the stand 221 in the sub-scanning direction.

The standing wall 223 guides the cooling air that has passed through the space 242, between the glass substrate 211 and the legs 221*a* of the stand 221 in the sub-scanning direction, to the side of the base holder 200 in the optical axis direction. The cooling air guided to the side of the base holder 200 and the cooling air that has passed through the spaces 241 and 243, flow out to a space (hereinafter, refer to an "external space") 260 on the side opposite to the supporting surface 202 of the base holder 200, through the through hole 201. As illustrated in FIG. 2, the external space 260 is surrounded by the base holder 200 having the substantially U shape on three sides, and elongates in the main scanning direction.

For a sectional area through which the cooling air passes, the spaces 242, 243, and 244 and the through hole 201 are larger than the space 241. Furthermore, the cooling air flows in the main scanning direction in the external space 260, and thus large negative pressure occurs on the side of the external space 260 of the base holder 200. When the cooling air flows through the spaces 242, 243, and 244 and the through hole 201 with this arrangement, the flow of the cooling air in the space 241 accelerates and the drive IC 215 is cooled, so that the drive IC 215 is inhibited from rising in temperature.

Differently from the related art, there is no need to narrow the space 241 in the optical axis direction in order to ensure the amount of the cooling air flowing through the space 241, and thus noise arising from the flow of the cooling air can be inhibited from occurring. There is no need to add a member in order to ensure the amount of the cooling air flowing through the space 241, and thus component costs and assembly costs can be prevented from increasing.

[3] Modifications

The embodiment of the present invention has been described above. Needless to say, the present invention is not limited to the above embodiment, and thus the following modifications can be performed. (1) According to the embodiment, the example in which the cooling air travels in the main scanning direction in the external space 260 without being interrupted, has been described. Needless to say, the present invention is not limited to this, and thus the following arrangement may be made instead of the example.

Figure 5A:
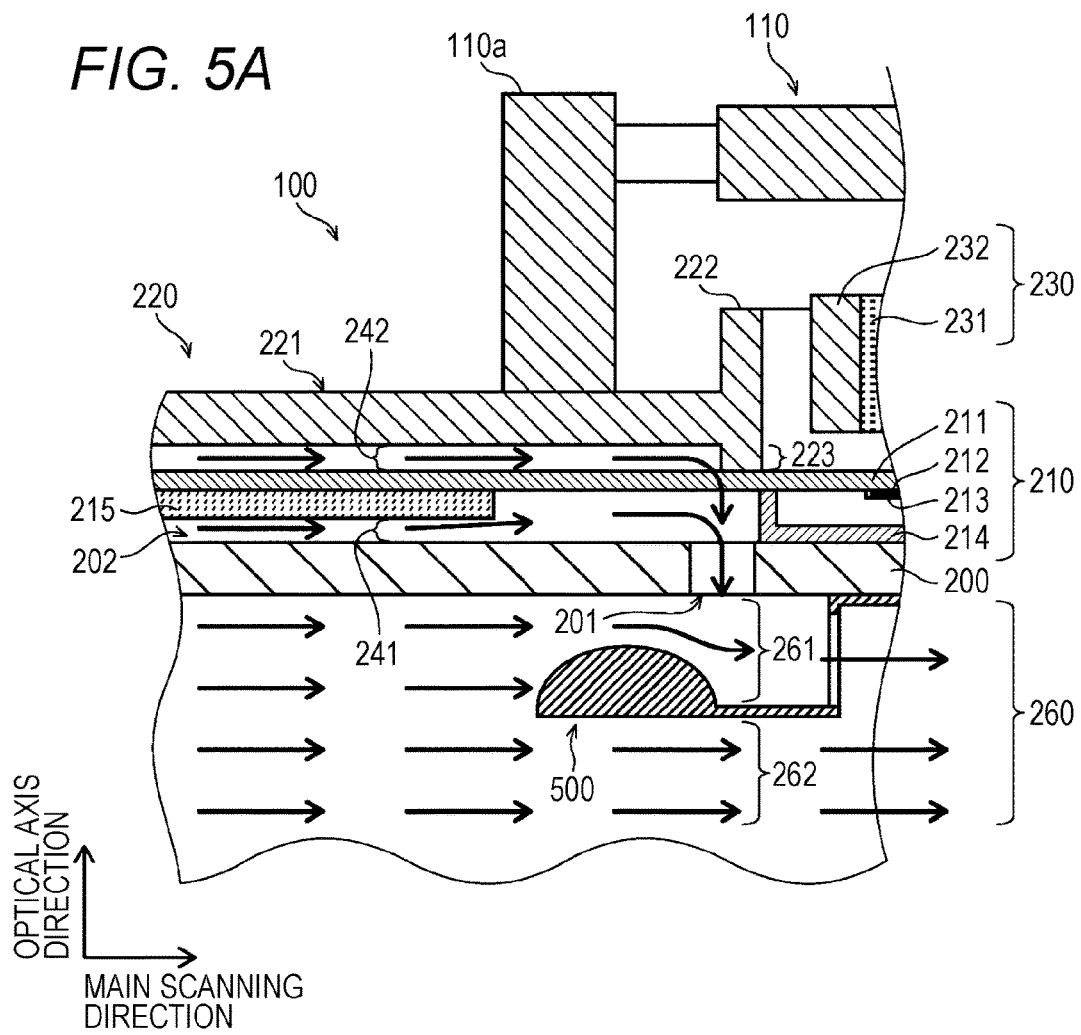
FIG. 5A is a sectional view of the main configuration of an optical writing apparatus according to a modification.
Figure 5B:
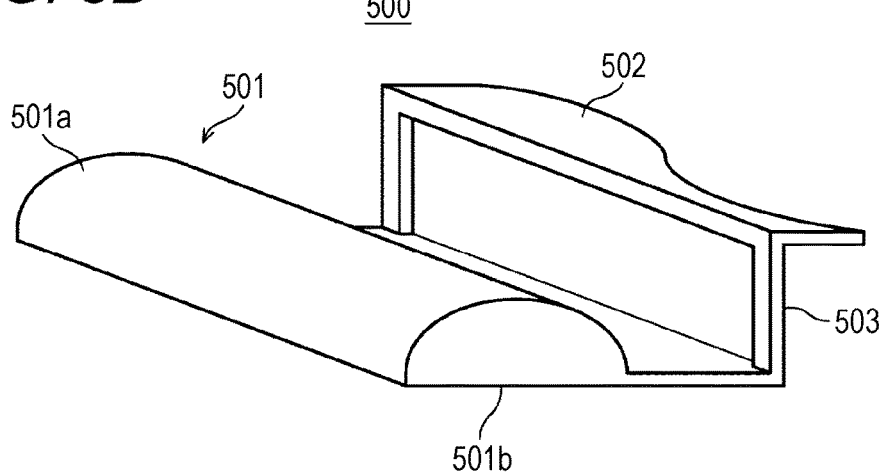
FIG. 5B is an external perspective view of a cooling air control member.

As illustrated in FIGS. 5A and 5B, a base holder 200 according to the present modification, has a cooling air control member 500 attached on the side of an external space 260. The cooling air control member 500 includes a wing 501 and a stator 502 coupled through an arm 503, and is provided over the entire width of the external space 260 in a sub-scanning direction. With the stator 502 fixed on the side of the external space 260 of the base holder 200, cooling air flows faster on the surface 501a facing the base holder 200, of the wing 501 than on the surface 501b on the opposite side.

Thus, air pressure drops more in a space 261 intervening between the base holder 200 and the wing 501 than in a space 262 on the opposite side of the wing 501 and then negative pressure can rise on the side of the external space 260 of a through hole 201, so that the cooling air easily flows through a space 241. Therefore, the use of the cooling air control member 500 can effectively inhibit a drive IC 215 from rising in temperature. (2) According to the embodiment, the example in which the through hole 201 is provided to the base holder 200 between the drive IC 215 and the sealing member 214 in the main scanning direction, has been described. Needless to say, the present invention is not limited to this, and thus the following arrangement may be made instead of the example.

Figure 6:
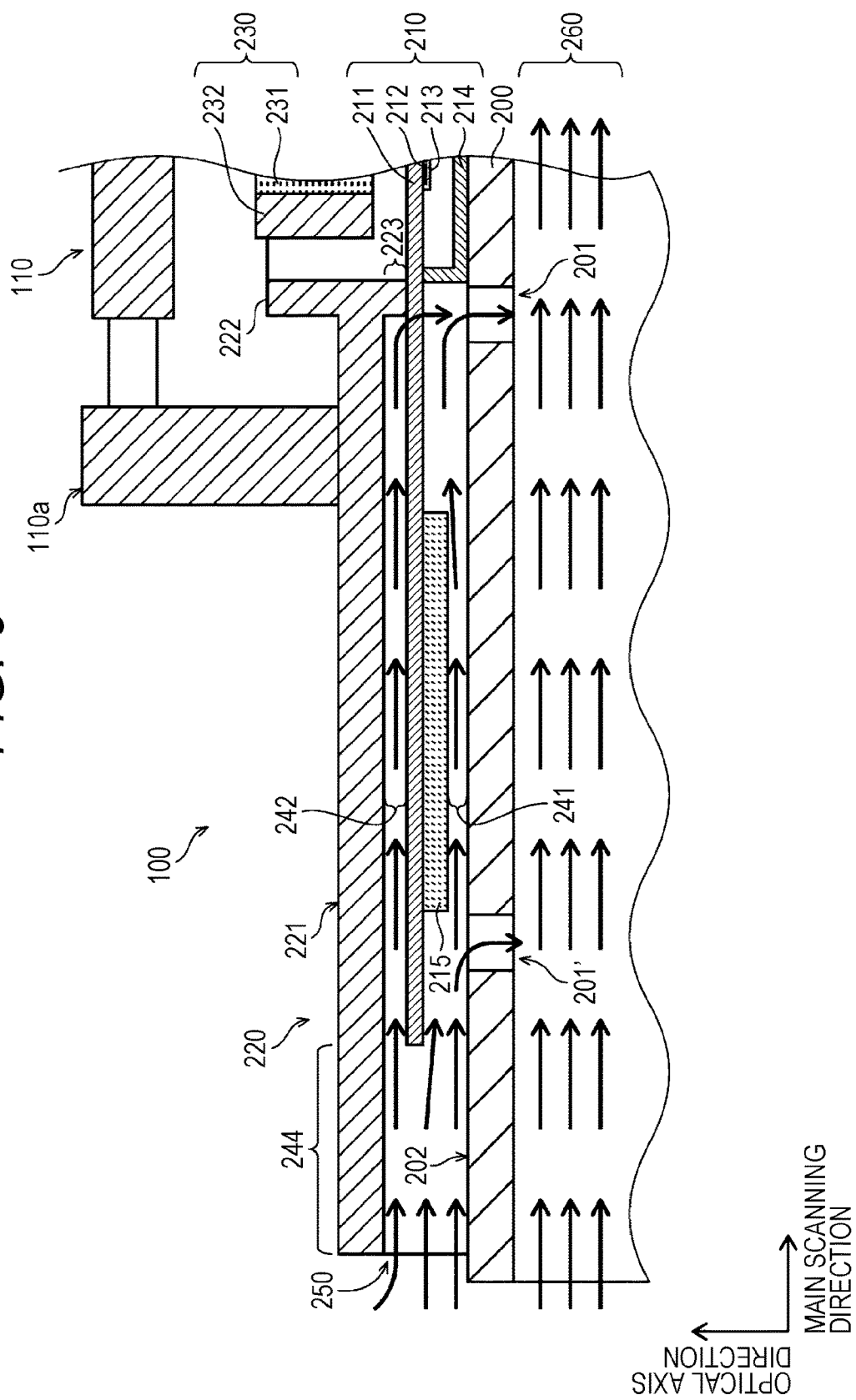
FIG. 6 is a sectional view of the main configuration of an optical writing apparatus according to a modification.

For example, as illustrated in FIG. 6, a through hole 201' may be provided to a base holder 200 upstream from a drive IC 215 in the flowing direction of cooling air, in addition to a through hole 201. This arrangement can increase the surface area of the base holder 200, so that a heat dissipation effect can improve through the base holder 200. Therefore, in addition to heat dissipation due to the blow of the cooling air to the drive IC 215, the cooling air blows the base holder 200 to inhibit the surface temperature of the base holder 200 from rising, so that the drive IC 215 is inhibited from rising in temperature.

Note that, even when the number of through holes to be provided to the base holder 200 is three or more, a similar effect can be acquired. (3) According to the embodiment, the example in which the standing wall 223 is erectly provided extending perpendicularly from the lower surface facing the glass substrate 211, of the stand 221, has been described. Needless to say, the present invention is not limited to this, and thus the following arrangement may be made instead of the example.

According to the embodiment, a wall surface (hereinafter, referred to as a "front surface") blown by the cooling air, positioned on the side of the drive IC 215, in the wall surfaces of the standing wall 223, is orthogonal to the lower surface (hereinafter, referred to as a "facing surface") facing the glass substrate 211, of the stand 221, at a base of the standing wall 223. When the cooling air flows, the air pressure rises at a maximum at a corner formed by the front surface and the facing surface, and thus the cooling air turns toward the through hole 201 at the corner.

Figure 7A:
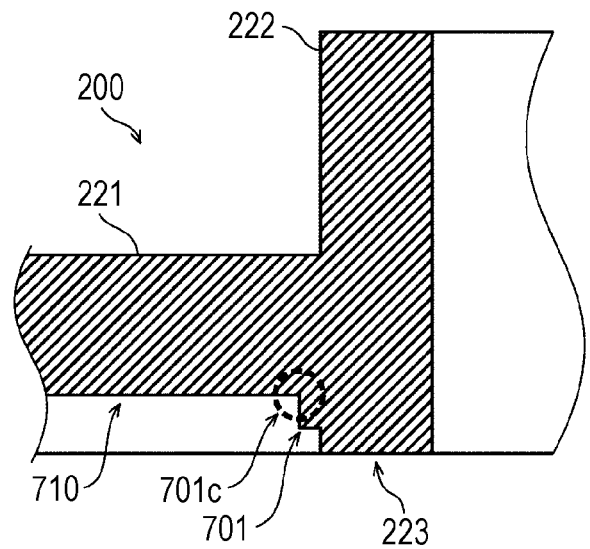
FIGS. 7A and 7B are each a sectional view of the shape of a standing wall according to a modification.

In contrast to this, for example, as illustrated in FIG. 7A, a step 701 lower than a standing wall 223 is provided onto the front surface of the standing wall 223, so that air pressure rises at a maximum at a corner 701c formed by the front surface of the step 701 and the facing surface of a stand 221, and thus cooling air turns at the corner 701c.

The distance from the corner 701c to an emission region, is the width of the step 701 in a main scanning direction, larger than the distance from a corner with no step 701 provided, to the emission region. Therefore, the turning position of the cooling air can be made away from the emission region, so that the heat of the cooling air heated by a drive IC 215 can be inhibited from propagating to the emission region.

Figure 7B:
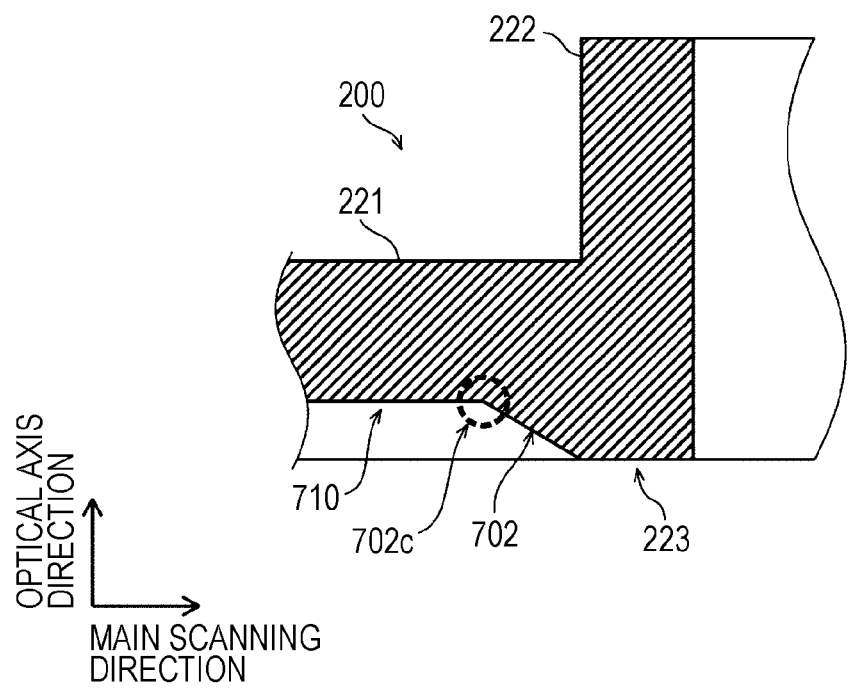
Figure 9:
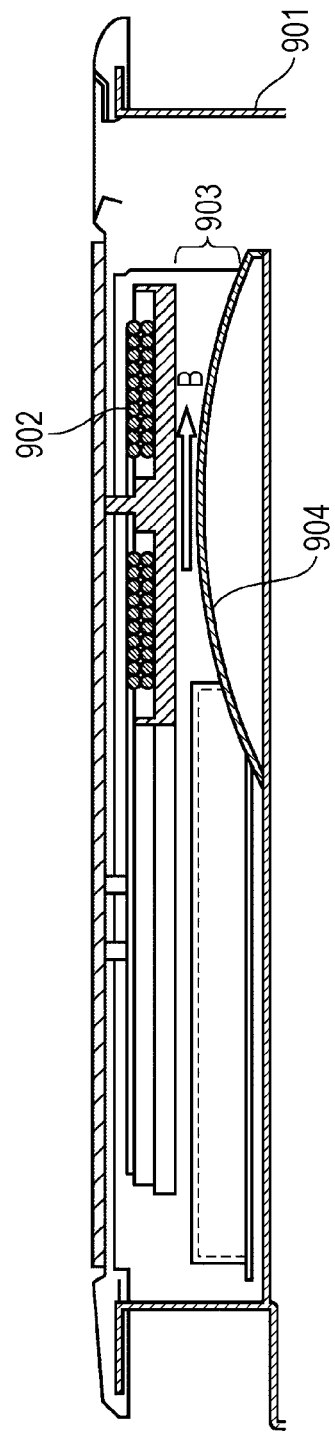
FIG. 9 is a sectional view of the main configuration of an induction heating cooker according to the related art.

As illustrated in FIG. 7B, the front surface of the standing wall 223 may have a taper surface 702. In this case, the air pressure rises at a maximum at a corner 702c formed by the taper surface 702 and the facing surface of the stand 221, and the turning position of the cooling air can be made away from the emission region, so that the emission region can be also inhibited from rising in temperature.

The distribution of the air pressure applied to the wall surface, is uniformized on the taper surface 702, so that the flow of the cooling air can improve in efficiency. Furthermore, the front surface of the standing wall 223 may have a recess surface being a curved surface smoothly connecting the facing surface with a drooping end of the standing wall 223.

In this manner, the front surface of the standing wall 223 has a shape such that the emission region is further away from a base of the standing wall 223 than the drooping end of the standing wall 223 in the main scanning direction, so that the heat generated by the drive IC 215 can be inhibited from propagating to the emission region through the cooling air. (4) According to the embodiment, the example in which the center position of the through hole 201 in the sub-scanning direction is identical to the center position of the drive IC 215 in the sub-scanning direction, has been described. Needless to say, the present invention is not limited to this, and thus the center positions in the sub-scanning direction may be different from each other. (5) According to the embodiment, the example in which the through hole 201 is rectangular in a plan view in the optical axis direction, has been described. Needless to say, the present invention is not limited to this, and thus the shape may be elliptical other than rectangular.

According to the embodiment, the example in which the inner wall surface of the through hole 201 is perpendicular to the main surface (upper surface) of the base holder 200, has been described. Needless to say, the present invention is not limited to this, and thus the inner wall surface may incline to the main surface. When the inner wall surface is made to incline, the opening from which the cooling air flows out of the through hole, may be larger in opening size than the opening from which the cooling air flows into the through hole. (6) According to the embodiment, the example in which the width of da of the through hole 201 in the sub-scanning direction, the width of db of the through hole 201 in the main scanning direction, and the width of dc of the drive IC 215 in the sub-scanning direction are in the size relationship expressed by Expressions (1) and (2), has been described. Needless to say, the present invention is not limited to this, and thus the effect of inhibiting the drive IC 215 from rising in temperature, can be to some extent acquired even when the widths are in a size relationship different from the size relationship. (7) According to the embodiment, the example in which the cooling air control member 500 is fixed to the base holder 200, has been described. Needless to say, the present invention is not limited to this, and thus the cooling air control member 500 may be fixed to a member other than the base holder 200, such as a housing of the image former 101, as long as the positional relationship between the cooling air control member 500 and the base holder 200 can be retained. (8) According to the embodiment, the example in which the image forming apparatus 1 is the tandem color printer, has been described. Needless to say, the present invention is not limited to this, and thus the image forming apparatus 1 may be a non-tandem color printer or monochrome printer instead of the tandem color printer. Even when the present invention is applied to a single-function peripheral, such as a copying machine having a scanner or a facsimile apparatus having a facsimile communication function, or a multi-function peripheral (MFP) having the functions, a similar effect can be acquired.

An optical writing apparatus and an image forming apparatus according to the present invention, are effective as an apparatus capable of effectively cooling an integrated circuit included in the optical writing apparatus.

According to an embodiment of the present invention, this arrangement can prevent noise from arising from the cooling air since the interval does not narrow between the integrated circuit and the second holding member. There is no need to add a component in order for the cooling air to flow through the interval, and thus component costs and assembly costs can be prevented from rising.

In this case, from a first space between an upper surface of the glass substrate and the first holding member, a second space surrounded by the first holding member and the second holding member at the one end, a third space in the through hole, a fourth space between the integrated circuit and the second holding member, and a fifth space between the legs and both ends of the integrated circuit in the lateral direction, the fourth space desirably has a minimum sectional area through which the cooling air passes, and a draft channel through which the cooling air flows in the longitudinal direction, is desirably provided on the side of the lower surface of the second holding member.

A cooling air control member disposed in the draft channel, may be further provided, the cooling air control member including a control wing that controls an air current of the cooling air. The control wing may have a surface facing the lower surface of the second holding member, larger in surface area than a back surface of the surface facing.

The first holding member may include a standing wall erectly provided on a face facing the glass substrate, of the first holding member, the standing wall having a drooping end abutting on the glass substrate. The standing wall may be positioned identically to a position of the through hole or be positioned on the center side from the through hole, in the longitudinal direction.

The standing wall desirably has a base closer to the integrated circuit than the drooping end, in the longitudinal direction.

The standing wall may have a wall surface on a side of the integrated circuit in the longitudinal direction, the wall surface having a plurality of planes perpendicular to the face facing the glass substrate, of the first holding member, or may have a wall surface on a side of the integrated circuit in the longitudinal direction, the wall surface having an incline inclining to the face facing the glass substrate, of the first holding member.

A positioning member that regulates a positional relationship between the first holding member and the object to be irradiated, may abut on the first holding member from a side of the object to be irradiated, and the standing wall may be disposed differently from a position at which the positioning member abuts on the first holding member, in the longitudinal direction.

The second holding member may have one or a plurality of heat dissipation through holes, provided to the upper surface facing the integrated circuit, and the heat dissipation through holes may be disposed astride the integrated circuit together with the through hole, in the longitudinal direction.

A center of the through hole is desirably identical to a center of the integrated circuit in the lateral direction.

A width of the through hole in the lateral direction is favorably larger than both of a width of the through hole in the longitudinal direction and a width of the integrated circuit in the lateral direction, in a plan view in an optical axis direction of the optical member.

An image forming apparatus according to the present invention includes the optical writing apparatus according to the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An optical writing apparatus comprising:
   a light source panel including a plurality of light emitting elements linearly arranged on an elongate glass substrate, wherein the glass substrate is elongate in a longitudinal direction;
   an optical member that causes emergent light from the plurality of light emitting elements to form an image onto an object to be irradiated;
   a first holding member holding the optical member;
   a second holding member holding the glass substrate so that the glass substrate floats above the second holding member,
   wherein legs are provided below the first holding member on sides of both ends in a lateral direction of the glass substrate, the legs extending downward, lower ends of the legs being mounted and fixed on the second holding member, the first holding member and the second holding member surrounding the glass substrate such that a space is present above and below the glass substrate; and
   an integrated circuit that drives the light emitting elements to turn on provided on a lower surface on a side of one end of the glass substrate that is positioned inside the space surrounded by the first holding member and the second holding member,
   wherein a through hole is provided through an upper surface of the second holding member on a center side of and spaced from the integrated circuit in the longitudinal direction, and
   when cooling air for the integrated circuit flows from the side of the one end into the space surrounded by the first holding member and the second holding member, the cooling air is guided through the through hole to a space below a lower surface of the second holding member.

2. The optical writing apparatus according to claim 1, wherein, from a first space between an upper surface of the glass substrate and the first holding member, a second space surrounded by the first holding member and the second holding member at the one end, a third space in the through hole, a fourth space between the integrated circuit and the second holding member, and a fifth space between the legs and both ends of the integrated circuit in the lateral direction, the fourth space has a minimum sectional area through which the cooling air passes, and
   a draft channel through which the cooling air flows in the longitudinal direction, is provided on the side of the lower surface of the second holding member.

3. The optical writing apparatus according to claim 2, further comprising:
   a cooling air control member disposed in the draft channel, the cooling air control member including a control wing that controls an air current of the cooling air,
   wherein the control wing has a surface facing the lower surface of the second holding member, larger in surface area than a back surface of the surface facing.

4. The optical writing apparatus according to claim 1, wherein the first holding member includes a standing wall erectly provided on a face facing the glass substrate, of the first holding member, the standing wall having a drooping end abutting on the glass substrate, and the standing wall is positioned identically to a position of the through hole or is positioned on the center side from the through hole, in the longitudinal direction.

5. The optical writing apparatus according to claim 4, wherein the standing wall has a base closer to the integrated circuit than the drooping end, in the longitudinal direction.

6. The optical writing apparatus according to claim 5, wherein the standing wall has a wall surface on a side of the integrated circuit in the longitudinal direction, the wall surface having a plurality of planes perpendicular to the face facing the glass substrate, of the first holding member.

7. The optical writing apparatus according to claim 5, wherein the standing wall has a wall surface on a side of the integrated circuit in the longitudinal direction, the wall surface having an incline inclining to the face facing the glass substrate, of the first holding member.

8. The optical writing apparatus according to claim 4, wherein a positioning member that regulates a positional relationship between the first holding member and the object to be irradiated, abuts on the first holding member from a side of the object to be irradiated, and the standing wall is disposed differently from a position at which the positioning member abuts on the first holding member, in the longitudinal direction.

9. The optical writing apparatus according to claim 1, wherein the second holding member has one or a plurality of heat dissipation through holes, provided to the upper surface facing the integrated circuit, and the heat dissipation through holes are disposed astride the integrated circuit together with the through hole, in the longitudinal direction.

10. The optical writing apparatus according to claim 1, wherein a center of the through hole is identical to a center of the integrated circuit in the lateral direction.

11. The optical writing apparatus according to claim 1, wherein a width of the through hole in the lateral direction is larger than both of a width of the through hole in the longitudinal direction and a width of the integrated circuit in the lateral direction, in a plan view in an optical axis direction of the optical member.

12. An image forming apparatus comprising:
the optical writing apparatus according to claim 1.

* * * * *